Nov. 25, 1969 R. M. HOWE 3,480,767

DIGITALLY SETTABLE ELECTRONIC FUNCTION GENERATOR USING TWO-SIDED INTERPOLATION FUNCTIONS

Filed June 12, 1967 6 Sheets-Sheet 1

INVENTOR.
ROBERT M. HOWE

BY Richard D. Stephens

ATTORNEY

INVENTOR.
ROBERT M. HOWE
BY Richard G. Stephens
ATTORNEY

INVENTOR.
ROBERT M. HOWE
BY Richard D. Stephens
ATTORNEY

INVENTOR.
ROBERT M. HOWE
BY Richard D. Stephens
ATTORNEY

Nov. 25, 1969 R. M. HOWE 3,480,767

DIGITALLY SETTABLE ELECTRONIC FUNCTION GENERATOR USING TWO-SIDED INTERPOLATION FUNCTIONS

Filed June 12, 1967 6 Sheets-Sheet 5

INVENTOR.
ROBERT M. HOWE
BY Richard G. Stephens
ATTORNEY

INVENTOR.
ROBERT M. HOWE
BY Richard D. Stephens
ATTORNEY

United States Patent Office 3,480,767
Patented Nov. 25, 1969

3,480,767
DIGITALLY SETTABLE ELECTRONIC FUNCTION GENERATOR USING TWO-SIDED INTERPOLATION FUNCTIONS

Robert M. Howe, Ann Arbor, Mich., assignor to Applied Dynamics, Inc., Ann Arbor, Mich., a corporation of Michigan Filed June 12, 1967, Ser. No. 651,932
Int. Cl. G06g 7/26
U.S. Cl. 235—150.53 11 Claims

ABSTRACT OF THE DISCLOSURE

A high-bandwidth, high-accuracy, digitally-settable diode function generator which uses two-sided interpolation functions and time-shares digital-to-analog converter devices in generation of both sides of the interpolation functions, for use for both single-variable and multivariable function generation.

This invention relates to electronic analog function generation, and more particularly to means for generating functions of one or more analog input voltages with high precision and bandwidth, using automatic means, such as a digital computer or card reader, for converting stored data points into digital signals to produce a desired function. The invention is applicable to both single and independent variable and multivariable function generation.

Figures 2A, 2B, 2C:
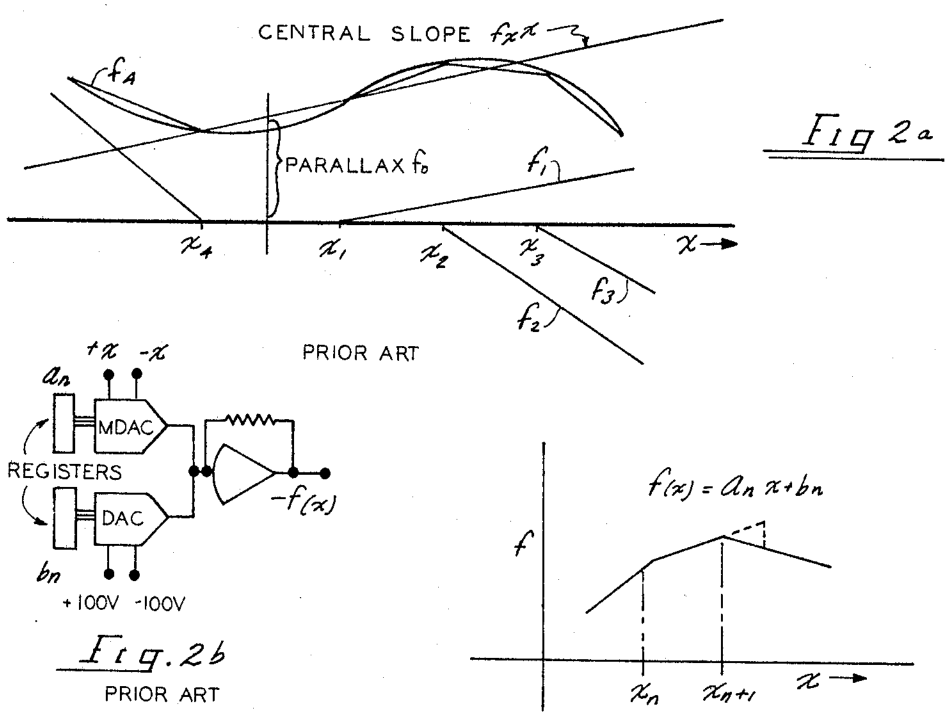
Fig 2a, Fig. 2b, Fig. 2c PRIOR ART

In the computer, automatic control, simulation and instrumentation arts, a wide variety of applications require that voltages be generated as a function of one or more independent variables. The most commonly used device for analog function generation, at least in recent years, has been the diode function generator. In such a function $f(x)$ is approximated using a finite number of straight lines as illustrated in FIG. 2*a*, by summing together in an operational amplifier a parallax bias term $f_0$, a linear central-slope term $f_x(x)$, and a plurality of slope incremental functions $f_1$, $f_2$, $f_3$ . . . . The slope incremental functions are generated using simple biased diode networks connected to the summing junction of the operational amplifier. The breakpoint voltages $x_1$, $x_2$, . . . can be distributed on either or both sides of the origin $x=O$. A main disadvantage of such prior art function generators has been the time required to adjust them to provide a desired function. An N-segment function has required one setting for parallax, one for central slope, and 2(N−1) settings for the breakpoints and slope increments. Usually these settings have accomplished with hand-set potentiometers, in an exact procedural order which has been time-consuming, and such set-up time has remained undesirably time-consuming even when the hand-set potentiometers have been replaced by servo-set potentiometers. Also, servo-set (or hand-set) diode function generators have been undesirably complex and expensive, and have tended to have poor dynamic performance due to the capacitive characteristics of the multi-turn helical potentiometers utilized for such function generation.

A wide variety of schemes have been proposed to improve the function setup speed of conventional diode function generators, including means such as the storage of breakpoints and slope increments on punched cards with punched holes representing breakpoint or slope bits, and the use of removable patchboards to store the required connections to implement desired functions. Some such function generators have been undesirable in that they have required special card readers, and some have been difficult to set up accurately due to the effects of diode-rounding and breakpoint interaction with slope sensitivity. Prior diode function generators using either cards or patchboards for function storage have been tedious and time-consuming to set up unless extensive digital computer programs have been available for such purposes.

A further known type of function generator is a hybrid (both analog and digital) type which employs a DAC (digital-to-analog converter) and an MDAC (multiplying digital-to-analog converter) terminated in an operational amplifier, as illustrated in FIGS. 2*b* and 2*c*. The function $f(x)$ is represented over the $n$th straight-line segment by the formula $$f(x)=a_n x+b_n,\ x_n \angle x \angle x_{n+1} \quad (1)$$

The slope $a_n$ and intercept $b_n$ are obtained from a digital computer, and are updated to new values every time the independent input variable $x$ passes into a new segment region. In these function generators linear interpolation is accomplished by analog means and storage is accomplished in the digital computer. A main disadvantage of these prior art schemes is the discontinuous jump in the output function which results from any delay in updating $a_n$ and $b_n$ to new values when $x$ enters a new segment region. Such a discontinuity is illustrated by the dashed curve in FIG. 2*c*. Variations of the abovementioned scheme using sawtooth and triangular analog interpolating functions have been suggested in the prior art, as has utilization of the scheme for generating functions of two or more variables.

It is a primary object of the present invention to provide an improved electronic analog function generator having high precision and bandwidth which may be set by automatic means.

It is a further object of the invention to provide such an improved function generator in an economical manner.

It is another object of the present invention to provide a function generator which overcomes the abovementioned disadvantages of prior art function generators.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

Figure 1:
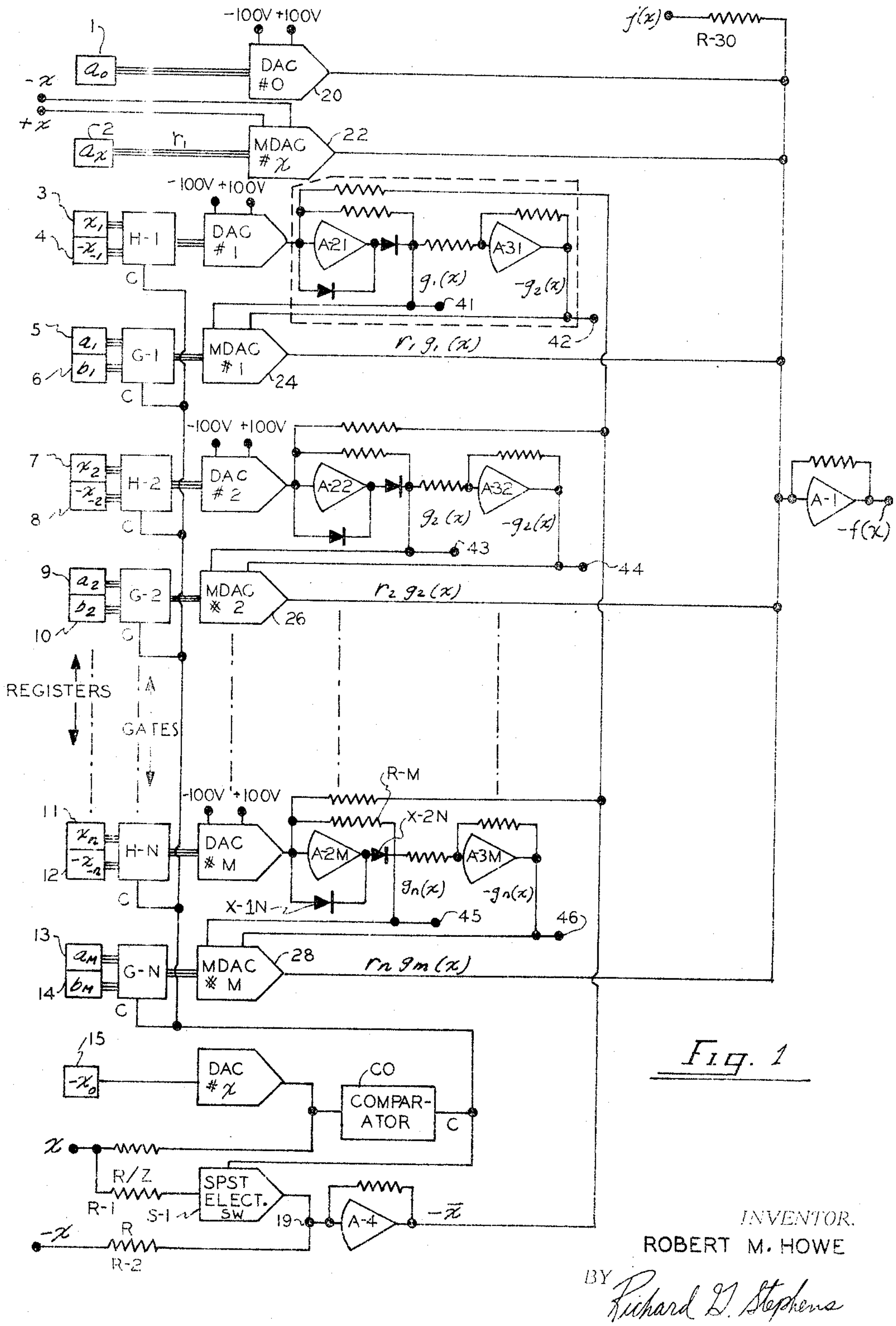

For a fuller understanding of the nature and objects of the invention reference should be had to the following detailed description taken in connection with the accompanying drawings, in which:

FIG. 1 is an electrical schematic diagram partially in block form, of an exemplary single-variable function generator constructed in accordance with the invention.

Figure 1A:
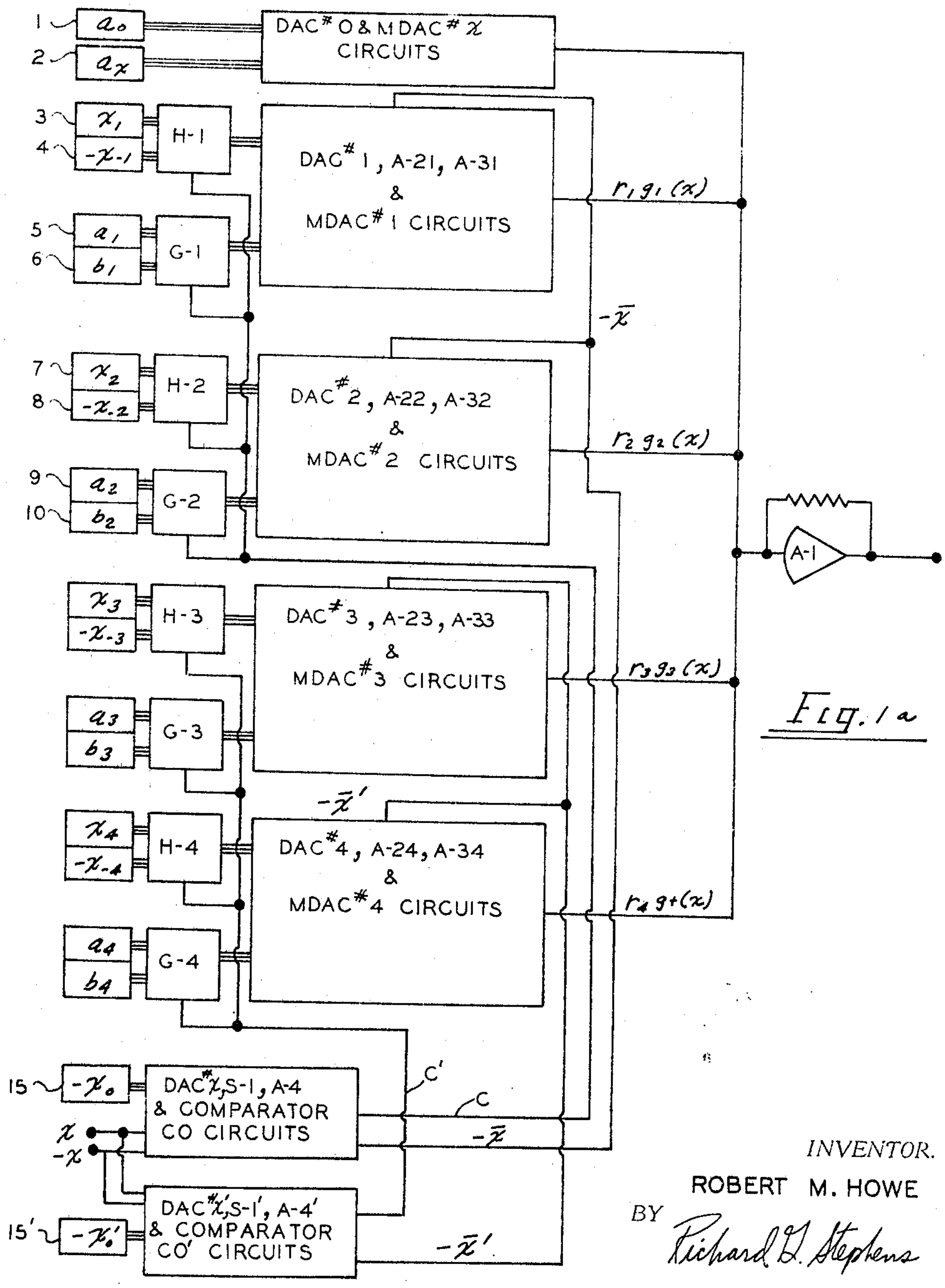

FIG. 1*a* is a schematic diagram of one alternative form of single-variable function generator.

FIG. 2*a* is a graph useful in understanding the operation of typical diode function generators of the prior art.

FIG. 2*b* is a schematic diagram illustrating a known type of prior art hybrid function generator.

FIG. 2*c* is a graph useful in understanding the operation of the prior art function generator of FIG. 2*b*.

Figure 3D:
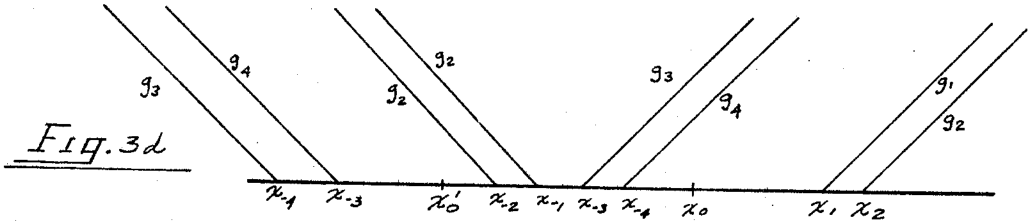
Figure 3A:
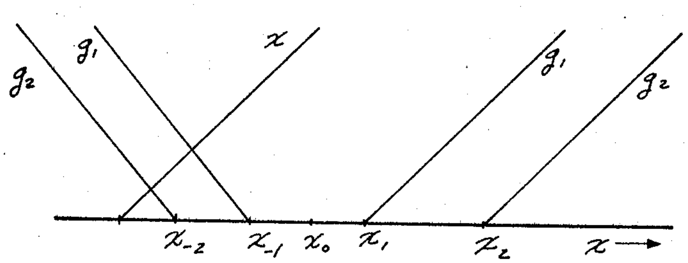

FIG. 3*a* is a graph showing a plurality of two-sided interpolation functions of a type which may be used in practicing the present invention.

Figure 3B:
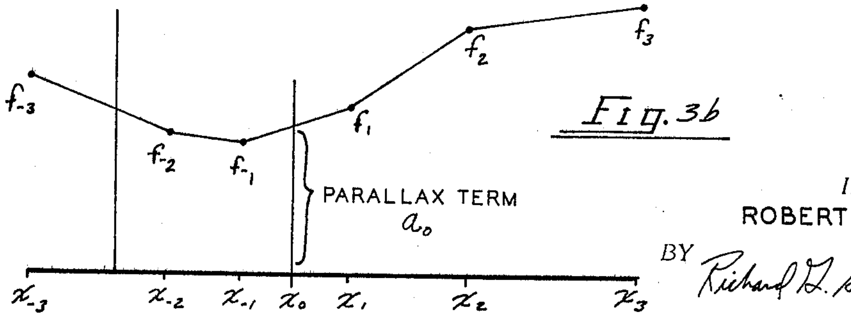

FIG. 3*b* is a graph showing a typical segmented function.

Figure 3C:
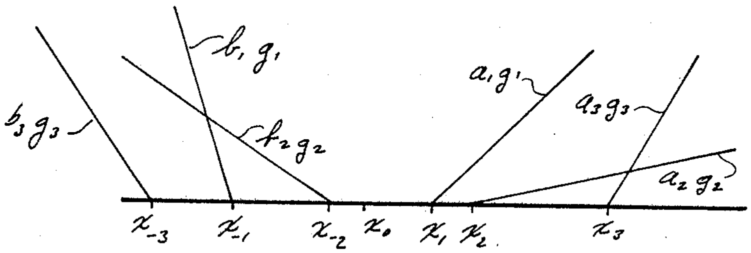

FIG. 3*c* is a graph useful in understanding various modifications which may be employed in using the embodiment of the invention shown in FIG. 1.

FIG. 3*d* is a graph useful in understanding the operation of the alternative embodiment of the invention illustrated in FIG. 1*a*.

Figure 4A:
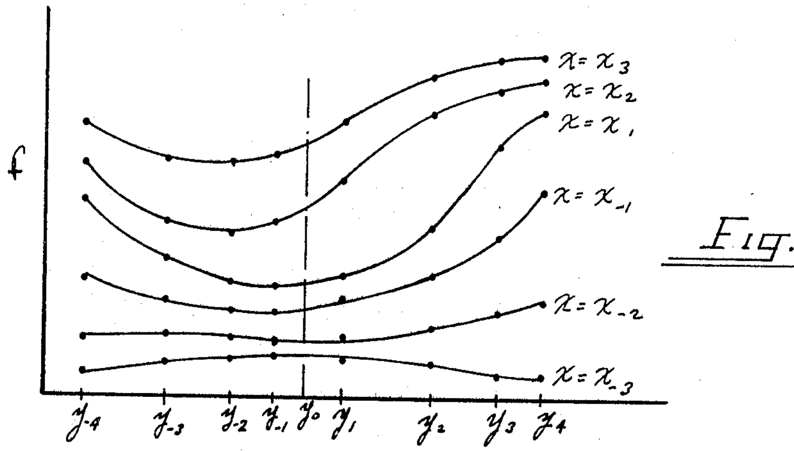
Figure 4B:
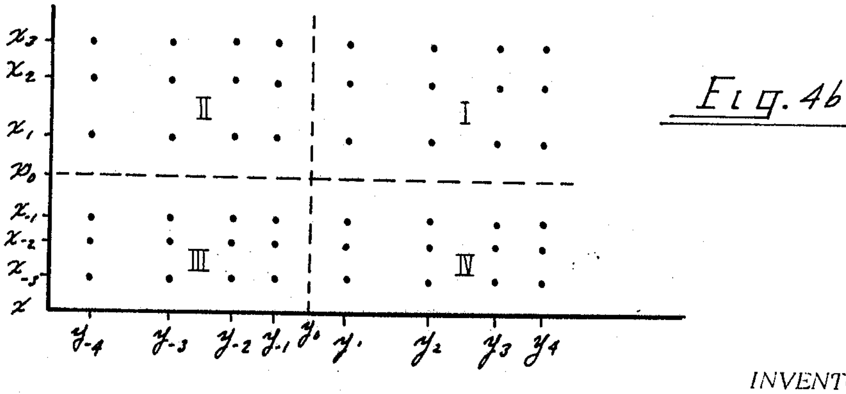

FIGS. 4*a* and 4*b* are respectively a graph and a plot of points illustrating a two-variable function.

Figure 5A:
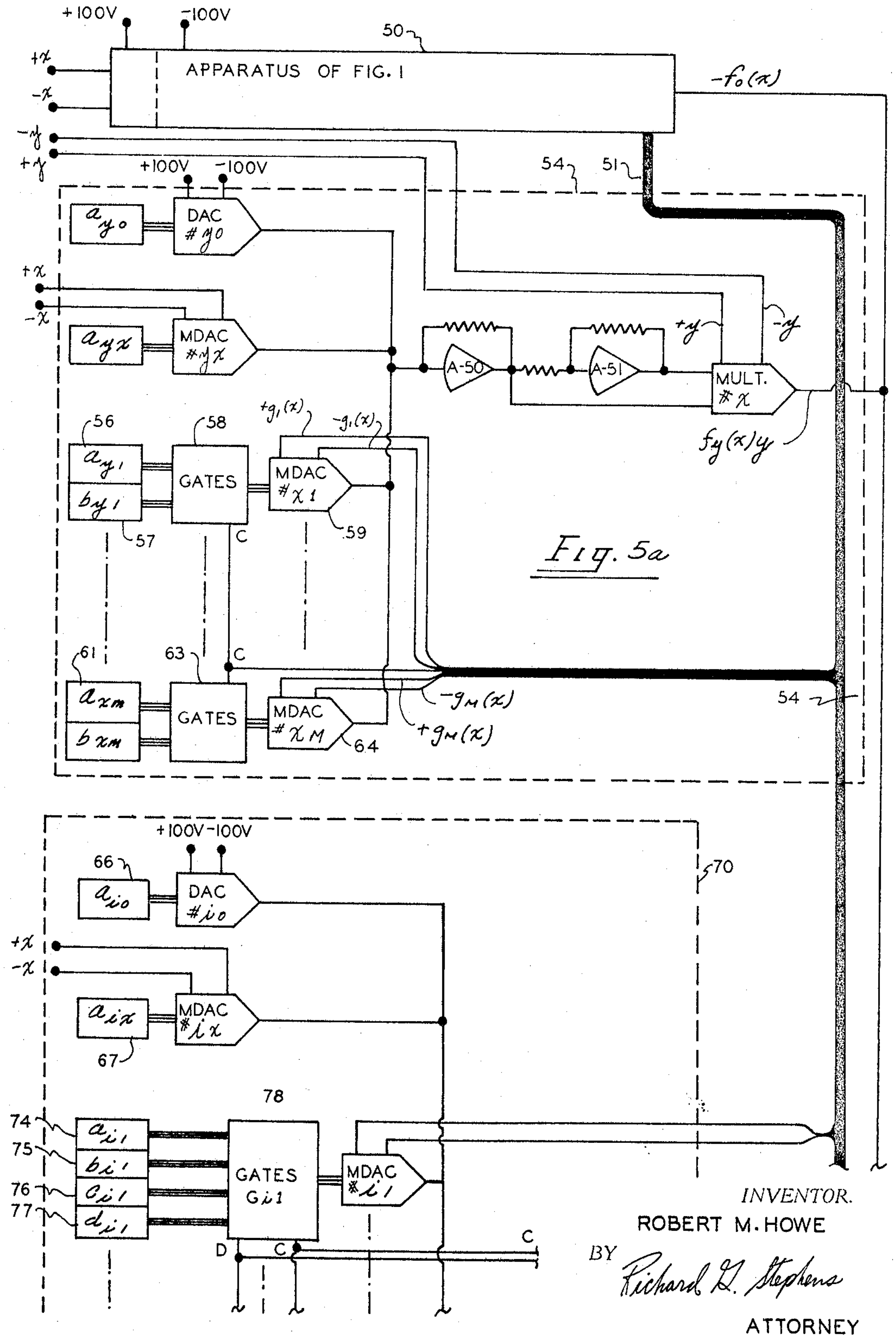
Figure 5B:
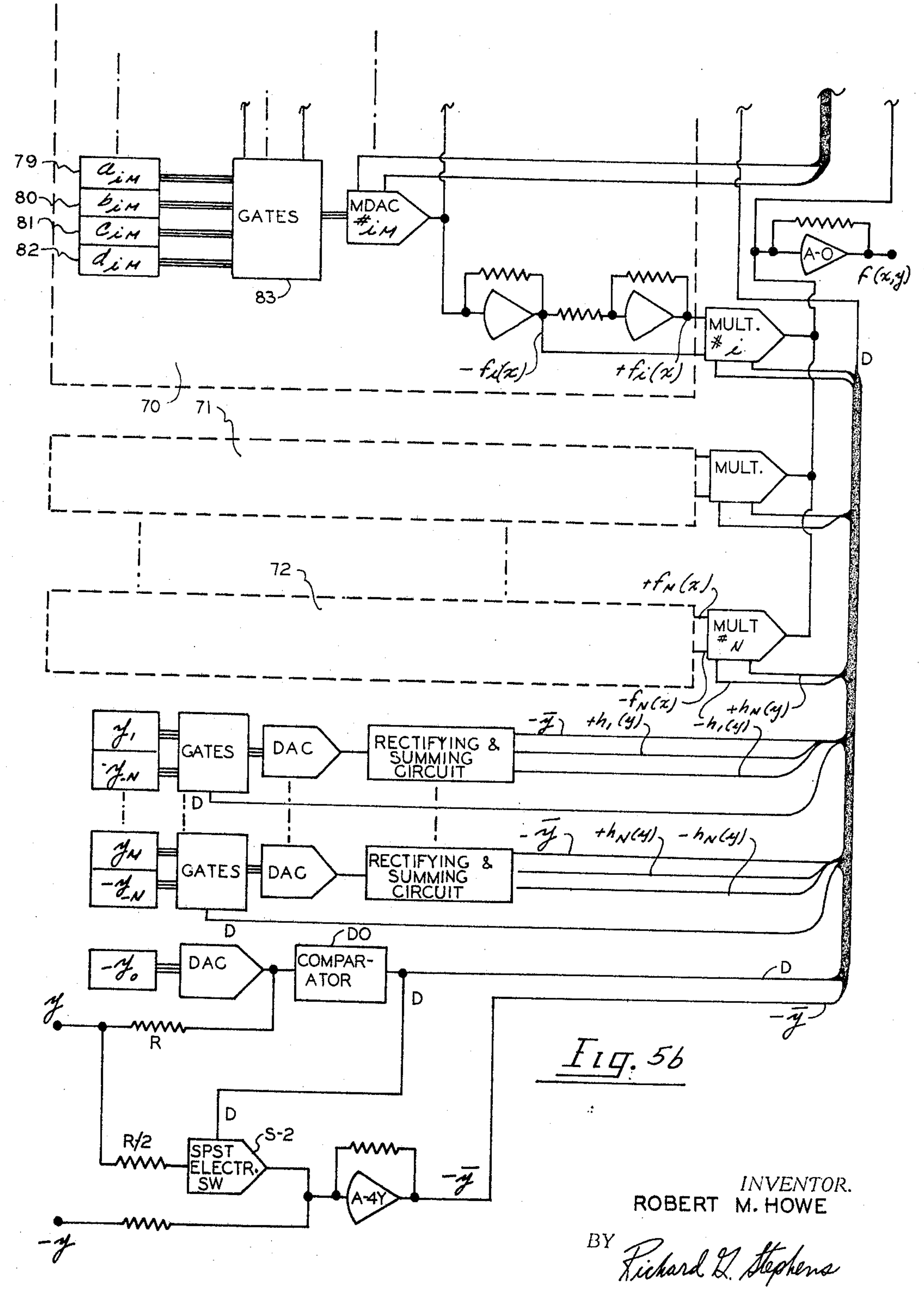

FIGS. 5*a* and 5*b* together comprise a schematic diagram of an exemplary two-variable function generator constructed in accordance with the invention.

A central concept of the present invention involves generation of an analog function using two-sided interpolation functions of the type illustrated in FIG. 3*a*. Each interpolating function $g_n(x)$ has a unit positive slope with an intercept $x_n$ on the $x$ axis, and a unit negative slope with an intercept $x_{-n}$, and the function $g_n(x)$ is never negative. It may be shown that any single-valued function $f(x)$ can be constructed by superimposing a plurality of such two-sided interpolation functions $g_n(x)$ upon a linear function of $x$ and a constant, much as $f(x)$ is synthesized in the prior art diode function generator of FIGS. 2*a* and 2*b*, and a typical segmented representation of a function is illustrated in FIG. 3*b*. It must be insured, however, that each interpolating function $g_n(x)$ is multiplied by a coefficient $a_n$ (either positive or negative) whenever the independent variable is greater than a reference value $x_0$, and by a different coefficient $b_n$ (either positive or negative) whenever the independent variable is less than $x_0$. The reference value $x_0$ may lie, for example, midway between the adjacent plus and minus breakpoints $x_1$ and $x_{-1}$, as shown in FIG. 3*a*. Thus a formula for representing $f(x)$ may be written as follows:

$$f(x)=a_0+a_xx+\sum_{n=1}^{M}a_ng_n(x),\ x>x_0 \quad (1)$$

$$f(x)=a_0+a_xx+\sum_{n=1}^{M}b_ng_n(x),\ x<x_0 \quad (2)$$

where $f(x)$ is represented by 2M+2 data points.

The above formula may be implemented using DAC's and MDAC's in the manner illustrated in FIG. 1. A conventional summing amplifier A–1 terminates the current output of the DAC shown at 20 and the MDAC's shown at 22, 24, 26, and 28. DAC #0, which is supplied with +100 and −100 volt reference voltages, converts the digital output word of the register 1 containing the parallax quantity $a_0$ to an analog current representing $a_0$. Similarly, MDAC #$x$ shown at 22 converts the output of the register 2 containing the central slope $a_x$ quantity to a current representing $a_xx$, but because MDAC #$x$ is supplied with $+x$ and $-x$ input voltages as its reference voltages, the digitally-stored central slope quantity $a_x$ is multiplied by $x$. Registers 3 and 4 store the upper and lower breakpoint values $x_1$ and $x_{-1}$ of two-sided interpolating function $g_1(x)$ and MDAC #1 shown at 24 receives both polarities of the two-sided interpolating function $g_1(x)$ from the output circuits of amplifiers A–21 and A–31, as will be explained below in greater detail, and converts the output digital word $r_1$ from gate circuit G–1 to a current representing $r_1g_1(x)$. When the independent variable input voltage $x$ is greater than $x_0$, comparator circuit CO provides a logic "1" output signal C, which connects the contents ($a_1$) of register 5 to MDAC #1 by means of gate circuit G–1, and conversely, when $x$ is less than $x_0$, comparator CO provides a logic "0" signal to gate circuit G–1 to cause instead the contents ($b_1$) of register 6 to be applied to MDAC #1. MDAC #2, and the additional MDAC's, not shown, all the way up to MDAC #M shown at 28 operate similarly, multiplying one of the two-sided interpolating functions $g_2(x)$ . . . $g_M(x)$ by either the contents of their respective "A" register or their respective "B" register, depending upon the polarity of the input variable $x$ relative to the reference value $x_0$, with the logic output signal of comparator CO similarly controlling gates between each MDAC and its two input registers. Thus it will be seen that the circuit of FIG. 1 implements the above equation. It may be noted that the MDAC outputs in FIG. 1 are shown connected to the amplifier A–1 summing junction without intervening scaling resistors, it being preferred that the MDAC output signals comprise appropriate currents.

It should be noted that by providing two registers for each MDAC, with one register storing the slope increment for values of $x$ greater than $x_0$ and the other register storing that for values less than $x_0$, that the number of MDAC's required to represent the slope increments for generating $f(x)$ has been reduced by a factor of two.

It also is important to note that each of the two-sided interpolating functions $g_n(x)$ has zero output at the transition point ($x=x_0$) where comparator CO changes state to connect from the A registers to the B registers or vice versa, and thus it will be apparent that there will be absolutely no discontinuity or jump produced in the output function $-f(x)$ if $x$ passes slowly enough past the reference value $x_0$. In fact, if $t_d$ is the time required for comparator CO and the gate circuits to switch from one group of registers to the other, it can be seen that $\dot{x}_{max}$, the maximum allowable rate of change of the input variable $x$ without producing any such discontinuity, may be defined as follows:

$$\dot{x}_{max}=\frac{x_1-x_{-1}}{2t_d} \quad (3)$$

For example, assume that $t_d$ equals 5 microseconds and the $x_1-x_{-1}$ is equal to 10% of the full scale of $x$. Then $\dot{x}_{max}$ corresponds to 10% of full scale in ten microseconds, or full scale in 100 microseconds.

Consider now the illustrative circuitry shown in FIG. 1 for generating the two-sided interpolating functions. Amplifier A–4 is used to generate the voltage $-\bar{x}$, which is defined by the formula:

$$\bar{x}=x,\ x>x_0 \quad (4)$$
$$\bar{x}=-x,\ x<x_0$$

When the input voltage $x$ is greater than $x_0$, the logic output signal C from comparator CO is "1," thereby closing electronic switch S–1, and the output of amplifier A–4 equals $-(2x-x)=-x=-\bar{x}$ as required. Conversely, when the input voltage $x$ is less than $x_0$, so that logic signal C equals "0" and switch S–1 is open, the amplifier A–4 output equals $-(-x)=x=-\bar{x}$, as required. As shown in FIG. 1, the $-\bar{x}$ signal is applied as one input signal to each of summing amplifiers A–21, A–22 . . . A–2M. Gate circuit H–N is similarly controlled by comparator CO to connect the contents ($x_n$) of register 11 to DAC #M when $x$ is greater than $x_0$, and to connect the contents ($-x_{-n}$) to DAC #M when $x$ is less than $x_0$. The total input current to the summing junction of amplifier A–2M is therefore proportional to $-(x-x_n)$ when $x$ is greater than $x_0$, and proportional to $-(x_{-n}-x)$ when $x$ is less than $x_0$. Due to the diodes X–1N and X–2N connected in its feedback circuits as shown, amplifier A–2M functions like an ideal half-wave rectifier. When its output becomes positive, diode X–2N conducts, and the output signal $g_n(x)$ equals $x-x_n$ for $x$ inputs greater than $x_0$ and equals $x_{-n}-x$ for $x$ inputs less than $x_0$, as was shown to be required for the interpolating function $g_n(x)$. If instead the output of amplifier A–2M goes negative, diode X–2N becomes back-biased and the feedback path through resistor R–M is opened. However, as soon as the amplifier output goes approximately one-half a volt negative, diode X–1N conducts, and a feedback path is re-established through diode X–1N. The output terminal of amplifier A–2M thus is held at zero voltage, it being assumed that the A–2M operational amplifier has negligible offset voltage and extremely high open-loop gain. Amplifier A–3M simply serves as a unity-gain inverting amplifier to compute the interpolating function $-g_n(x)$, since both polarities of the interpolating functions will be required as MDAC inputs for many desired functions $f(x)$. As will be clear from FIG. 1 DAC #1 and amplifiers A–21 and A–31 similarly generate interpolating function inputs for MDAC #1, and DAC #2 and amplifiers A–22 and A–32 similarly generate interpolating function inputs for MDAC #2, and such circuits are repeated for each further MDAC added to FIG. 1.

It may be noted that the use of two registers 11 and 12 selectively switched to feed DAC #M eliminates the need otherwise of using two DAC's to generate the $x_n$ and $x_{-n}$ bias voltages for the two-sided interpolation function $g_n(x)$, and that the use of pairs of registers 3, 4 and 7, 8 similarly result in the need for only one DAC to generate each two-sided interpolation function.

It can be pointed out that whether one considers a function such as $g_1$ in FIG. 3*a* to be a single two-sided function or instead two separate single-sided functions is largely a matter of viewpoint. One can view the apparatus associated with DAC #1 and MDAC #1 either as a unitary device which produces a single two-sided interpolation function $g_1(x)$, or instead one can view the two sides of $g_1(x)$ as two different functions, with the mentioned apparatus being time shared between generation of such two different functions.

An alternative arrangement for generating the required $\bar{x}$ input for amplifiers A–21, A–22 . . . A–2M may be used. If reversed polarities are used on the input signals applied to the resistors R–1 and R–2, and the junction terminal 19 between switch S–1 and resistance R–2 is connected directly to the summing junction of amplifier A–2M, the need for amplifier A–4 is thereby obviated. Further separate electronic switches and resistors (not shown) like S–1, R–1 and R–2 then could be used to generate separate $\bar{x}$ input signals for amplifiers A–21 and A–22 and other similar amplifiers (not shown) but the elimination of the one amplifier may not be worth the requirement for the additional electronic switches.

If desired, the half-wave rectification performed by the two diodes in the feedback paths of amplifiers A–21, A–22 and A–2M could instead be performed more simply by use of a single diode between the input network and summing junction of each of those amplifiers, but with some loss of accuracy, particularly in low reference voltage (e.g. 10 volt) computers, due to the rounding in the characteristics of readily-available diodes.

It is extremely important to note that if additional functions of the same input voltage $x$ with the same breakpoints are required to be generated, only the circuitry terminating in amplifier A–1 need be repeated, and the two-sided interpolating functions $g_n(x)$ may be used to derive a plurality of such functions of $x$. For example, terminals 41–46 may be connected to drive three further MDAC's (not shown) which are similarly selectively connected to resepective pairs of registers (not shown) by similar gates (not shown) controlled by the comparator output signal C, and the outputs from such further MDAC's summed in another output summing amplifier together with further circuits similar to registers 1 and 2, DAC #0 and MDAC # X. As will be shown below, such savings in circuitry becomes extremely important when functions of two or more variables are to be generated.

The formulas need to calculate the input data to be supplied to the registers in FIG. 1 will now be set forth. Let $f_1, f_2, \ldots f_k$ and $f_{-1}, f_{-2}, \ldots f_{-k}$ be the function values at input variable $x$ values of $x_1, x_2, \ldots x_k$ and $x_{-1}, x_{-2}, \ldots x_{-k}$, respectively. It is easy to show that the central slope quantity $a_x$ and the intercept quantity $a_0$ are given by the following formulas:

$$a_x = \frac{f_1 - f_{-1}}{x_1 - x_{-1}} \qquad (5)$$

$$a_0 = f_1 - a_x x_1 \qquad (6)$$

Similarly, the slope increments $a_n$ and $b_n$ are given by the following formulas:

$$a_1 = \frac{f_2 - f_1}{x_2 - x_1} - a_x \qquad (7)$$

$$b_1 = \frac{f_{-2} - f_{-1}}{x_{-1} - x_{-2}} + a_x \qquad (8)$$

and $$a_n = \frac{f_{n+1} - f_n}{x_{n+1} - x_n} - a_{n-1} \text{ for } n = 2, 3 \cdots K-1 \qquad (9)$$

$$b_n = \frac{f_{-n-1} - f_{-n}}{x_{-n} - x_{-n-1}} - b_{n-1} \text{ for } n = 2, 3 \cdots K-1 \qquad (10)$$

In constructing a device following the principles of the preferred embodiment of FIG. 1 to generate a single function $f(x)$ of a single input variable $x$, given 2K data points at 2K values of $x$, it will be seen that the device will require 2K operational amplifiers, $K+1$ DAC's, K MDAC's, one comparator and one SPST electronic switch. The additional equipment requirements then, if one wishes to simultaneously generate an additional one-variable function using the same breakpoints are merely one operational amplifier, one DAC, and K MDAC's.

It is important to note that the terminating amplifier A–1 may be used to sum additional inputs in a specific computation or simulation application, as is suggested by the connection of a further input quantity $j(x)$ to resistor R–30 in FIG. 1.

While the exemplary embodiment illustrated in FIG. 1 and FIG. 3*a* is shown with the $x_0$ comparator switching point establshed precisely midway between the $x_1$ and $x_{-1}$ values of $x$, it will become apparent that $x_0$ may be established at any region where all of the incremental slode functions are zero, and nearer one such value than the other adjacent value, thereby increasing $\dot{x}_{max}$ for one direction of change of $x$ and simultaneously decreasing $\dot{x}_{max}$ for changes in the opposite direction, if such an operational characteristic is desired. A wide variety of computation and simulation problems, especially many which involve high-speed repetitive operation, require that a function be generated repeatedly with the input variable always changing in the same direction during the period of computation, and in many of those instances it will be highly advantageous to establish $x_0$, the switching point, very near or even exactly at one of the breakpoint values of the variable. For example, if the function represented in FIG. 3*a* were always generated beginning from an initial value somewhere to the left of the $x_{-1}$ point, then proceeding to the right eventually through $x_1$, $x_2$, etc., it would be advantageous to establish the $x_0$ switching point very near or even at the $x_{-1}$ point, thereby providing maximum distance between $x_0$ and $x_1$, and thereby increasing the maximum allowable rate-of-change of $x$ during the computation period without incurring switching transients.

Also, while FIGS. 3*a* and 3*b* illustrate a simple function using breakpoint values in pairs (e.g. $x_1$ and $x_{-1}$, $x_2$ and $x_{-2}$) which are symetrically disposed about the $x_0$ value, it is important to note that any desired digital values may be stored in the $x$ registers, and that $x_1$ need not exceed $x_0$ by precisely the same amount that $x_0$ exceeds $x_{-1}$, for example, nor do any such pair of breakpoint values need to be symmetrically disposed about the $x_0$ switching point value. Also, the two-sided interpolation functions provided by two different MDAC's may overlap, so that $x_{-1}$ is less than $x_{-2}$ even though $x_2$ is greater than $x_1$, as is illustrated in FIG. 3*c*. In FIG. 3*c* where the $x_0$ switching point is bridged by the $x_{-2}$ and $x_1$ values, it will be seen that the maximum input variable rate-of-change without discontinuity ($\dot{x}_{max}$) will be greater when $x$ increases than when $x$ decreases for the reason that $x_1$ is farther from $x_0$ than $x_{-2}$ is from $x_0$.

As mentioned above, the $x_0$ switching point in FIG. 1 may be established at any value of the input variable $x$ at which all of the incremental slope interpolating functions $g_n(x)$ are zero, and in FIG. 1, the maximum allowable rate-of-change of the input variable is limited by the proximity of that breakpoint value which is nearest to the $x_0$ value chosen. It is within the scope of the present invention to even further increase $\dot{x}_{max}$, and thereby even further increase the bandwidth of the function generator, by utilizing more than one switching point. The apparatus partially illustrated in FIG. 1*a* utilizes such a technique to provide the two-sided incremental slope functions shown in FIG. 3*d*. As in FIG. 1, comparator CO switches at the $x_0$ value of the input to control gate circuits G–1, G–2, H–1 and H–2 to provide the $g_1$ and $g_2$ outputs from MDAC #1 and MDAC #2. A second comparator CO′ has been added, however, to control gate circuits G–3, G–4, H–3 and H–4, to switch those gate circuits at the $x_0'$ value of $x$ to provide the $g_3$ and $g_4$ outputs from similar circuits containing MDAC #3 and MDAC #4, and a further electronic switch S–1′ and a further amplifier A–4′ provide a further signal $-\overline{x}'$ which provides the same operation with respect to $x_0'$ as S–1 and A–4 do with respect to $x_0$. The switching which occurs at the $x_0$ value of the variable now does not affect generation of the $g_3$ and $g_4$ functions, and similarly, the switching which occurs at the $x_0'$ value now does not affect the generation of the $g_1$ and $g_2$ functions. Accordingly, the maximum rate-of-change which the input variable now may have without causing a jump in the output will be much less limited, and will be dependent upon which one of the following quantities is less: $(x_1-x_0)$, $(x_0-x_{-1})$, $(x_3-x'_0)$ and $(x_0'-x_{-3})$. It now will be apparent that even further comparator and electronic switch circuits may be similarly added, to switch similar DAC and MDAC pairs at further values of the input variable, and pursued to the extreme, a separate comparator and electronic switch may be provided to switch each DAC–MDAC pair. With such an arrangement, the maximum allowable rate-of-change of the input variable without discontinuity then will be limited only by the length of the zero value portion of whichever two-sided function has the shortest zero-value portion. When synthesizing many functions such a zero-value portion can constitute a very large percentage (e.g. 70%) of the full scale of the variable $x$, so that the response time can be speeded up by a factor of seven, for example, over that of the device of FIG. 1.

As is well known to those skilled in the art, the functions to be generated for some applications do not require the bias term and/or the central slope term, and in such cases, the DAC #0 circuit and/or the MDAC #*x* circuit of FIGS. 1 and 1*a* and their associated registers could, of course, be eliminated. Even where a bias term for the output function is desired, one may provide it directly to amplifier A–1, of course, by applying a suitable voltage to resistor R–30, for example, instead of generating it by means of register 1 and DAC #0. Similarly, one may provide the central slope term to amplifier A–1 by means of a separate and external linear function generator (not shown) if desired, and simultaneously dispense with register 2 and MDAC #*x*.

GENERATION OF THE FUNCTIONS OF TWO VARIABLES

The invention is also applicable to the generation of voltages which vary as a function of two input variables. For example, the function $f(x, y)$ shown in FIG. 4*a* may be generated using a grid of points $x_i$, $y_i$ such as those shown in FIG. 4*b*, using two-sided interpolating functions $h_n(y)$ similar to those $g_n(x)$ generated by the single-variable apparatus of FIG. 1. By direct analogy with Equation 2 above, one may express the two-variable function as $$f(x,y)=f_0(x)+f_y(x)y+\sum_{i=1}^{N} f_i(x)h_i(y) \qquad (11)$$

where $$y_0=\frac{y_1+y_{-1}}{2} \text{ and } x_0=\frac{x_1+x_{-1}}{2} \qquad (12)$$

and where $$\left.\begin{aligned} f_0(x)&=a_{00}+a_{0x}x+\sum_{j=1}^{M} a_{0j}g_j(x) \quad x>x_0\\ &=a_{00}+a_{0x}x+\sum_{j=1}^{M} b_{0j}g_j(x) \quad x<x_0 \end{aligned}\right\} \qquad (13)$$

$$\left.\begin{aligned} f_y(x)&=a_{y0}+a_{yx}x+\sum_{j=1}^{M} a_{yj}g_j(x) \quad x>x_0\\ &=a_{y0}+a_{yx}x+\sum_{j=1}^{M} b_{yj}g_j(x) \quad x<x_0 \end{aligned}\right\} \qquad (14)$$

$$\left.\begin{aligned} f_i(x)&=a_{i0}+a_{ix}x+\sum_{j=1}^{M} a_{ij}g_j(x) \quad x>x_0,\ y>y_0\\ &=a_{i0}+a_{ix}x+\sum_{j=1}^{M} b_{ij}g_j(x) \quad x<x_0,\ y>y_0\\ &=a_{i0}+a_{ix}x+\sum_{j=1}^{M} c_{ij}g_j(x) \quad x<x_0,\ y<y_0\\ &=a_{i0}+a_{ix}x+\sum_{j=1}^{M} d_{ij}g_j(x) \quad x>x_0,\ y<y_0 \end{aligned}\right\} \qquad (15)$$

The term $f_0(x)$ in Equation 11, which is set forth in detail in Equation 13, represents the parallax or bias function which expresses the values which the two-variable functions $f(x, y)$ may take when $y=y_0$. The quantity $a_{00}$ in Equation 13 specifies the value of the function $f(x, y)$ when $x$ equals $x_0$ and $y$ equals $y_0$, the quantity $a_{0x}$ specifies the central slope at $y$ equals $y_0$ for any value of $x$, and $j$ identifies each breakpoint along the $x$ axis. It should be noted that for each value of $j$ there are actually two breakpoints along the $x$ axis, one at a value of $x$ greater than $x_0$, and one at a value of $x$ less than $x_0$. The breakpoints along that axis are then given by $x_{-M}$ through $x_{-1}$ and $x_1$ through $x_M$. Expression 13 is mechanized in FIG. 5 by apparatus shown as a single block 50 in FIG. 5*a* which apparatus may take the form of the single-variable function generator shown in FIG. 1. Assuming that the apparatus of FIG. 1 is used to provide the function of block 50, the quantities which may be supplied to the register 1 through 15 of the apparatus may be identified as follows:

| Register No.: | Quantity |
|---|---|
| 1 | $a_{00}$ |
| 2 | $a_{0x}$ |
| 3 | $x_1$ |
| 4 | $-x_{-1}$ |
| 5 | $a_{01}$ |
| 6 | $b_{01}$ |
| 7 | $x_2$ |
| 8 | $-x_{-2}$ |
| 9 | $a_{02}$ |
| 10 | $b_{02}$ |
| 11 | $x_M$ |
| 12 | $-x_{-M}$ |
| 13 | $a_M$ |
| 14 | $b_M$ |
| 15 | $-x_0$ |

The output signal $-f_0(x)$ from function generator 50 is applied as shown as one input signal to output summing amplifier A–0. As will be shown below, a number of further signals within block 50 are also used elsewhere in the apparatus of 5*a* and 5*b*, and in FIG. 5*a* such signals are shown (collectively for convenience of illustration) leading from block 50 in a multi-conductor cable 51.

The central slope function $f_y(x)$ expressed in Equation 14 is implemented by the apparatus shown within dashed lines at 54 in FIG. 5*a*. Signals commensurate with the first two terms of Equation 14 are provided in straightforward fashion by DAC #*yo* and MDAC #*yx* and supplied to summing amplifier A–50. The terms under the summation signs in Equation 14 are implemented by a series of M groups of register pairs, gate circuits and MDAC's, only the first group (56–59) and the last group (61–64) being shown in FIG. 5*a*. When the x input variable is less than the $x_0$ quantity derived within the apparatus of block 50 (FIG. 1), the C logic signal controls gate circuits (e.g. 58 and 63) to connect the "*a*" registers (e.g. 56 and 61) to their associated MDAC's (#*x*1 and #*x*M), and conversely, to connect the "*b*" registers (e.g. 57 and 62) when the *x* input variable is less than $x_0$. Each of the MDAC's in the series is also provided with both polarities of a respective one of the interpolating functions (e.g., $g_1(x)$ and $g_M(x)$) derived in the single-variable apparatus of FIG. 1 (block 50 in FIG. 5*a*. The output signals of DAC #*yo*, MDAC #*yx*, and each MDAC in the series between MDAC #*x*1 and MDAC #*x*M are all summed together by amplifier A–50 to provide the central slope quantity $f_y(x)$, which is inverted by amplifier A–51 to make the other polarity available for driving multiplier #*x*. Multiplier #*x* is provided as shown with the $+y$ and $-y$ input signals, and hence provides the output quantity $f_y(x)y$ represented by Equation 14. Multiplier #*x* preferably comprises a conventional diode quarter-squares multiplier.

The remainder of the apparatus shown in FIG. 5 implements Equation 15. Because 2N breakpoints are situated along the *x* axis, a total of N circuits of the type shown at 70 are required ,and in FIGS. 5*a* and 5*b* only the first circuit 70, the next breakpoint circuit 71, and the last circuit 72 in the series have been shown.

It will be noted that four registers (e.g. 74, 75, 76 and 77) are connected by gate circuit (e.g. 78) to each MDAC. Each gate circuit connects a selected one of its four associated registers to its associated MDAC, depending upon which one of the four quadrants the instantaneous $f(x, y)$ value lies in. The quadrants are identified by roman numerals in FIG. 4*b*, and control of the gates (e.g. 78, 83 and those between) is effected by the logic C signal derived as shown in connection with FIG. 1, and by a similar logic D signal similarly derived by DAC #*y* and comparator DO in FIG. 5. The outputs of multipliers #*i* through #N are summed with the parallax function and central slope function terms in summing amplifier A–0 to provide the desired $f(x, y)$ output.

Formulas for calculating the register entries $a_{ij}$, $b_{ij}$, $c_{ij}$ and $d_{ij}$ in terms of the two-variable function values in order to interpolate with respect to *y* now may be written as follows, by direct analogy with those set forth in Equations 5 through 10 for the single-variable apparatus.

$$f_0(x)=f(x, y_1)-f_y(x)y_1 \quad (16)$$

$$f_y(x)=\frac{f(x, y_1)-f(x, y_{-1})}{y_1-y_{-1}} \quad (17)$$

$$f_1(x)=\frac{f(x, y_2)-f(x, y_1)}{y_2-y_1}-f_y(x) \quad y>y_0 \quad (18)$$

$$f_1(x)=\frac{f(x, y_{-2})-f(x, y_{-1})}{y_{-1}-y_{-2}}+f_y(x) \quad y<y_0 \quad (19)$$

$$f_i(x)=\frac{f(x, y_{i+1})-f(x, y_i)}{y_{i+1}-y_i}-f_{i-1}(x) \quad y>y_0 \quad (20)$$

$$f_i(x)=\frac{f(x, y_{-i-1})-f(x, y_{-i})}{y_{-i}-y_{-i-1}}-f_{i-1}(x) \quad y<y_0 \quad (21)$$

where $i=2, 3, \ldots$ N in each case.

Next, one may obtain similar formulas for interpolation respect to *x* by using Equations 5 through 10 for $f_0(x)$, $f_x(x)$ and $f_i(x)$, thusly:

$$a_{yx}=\frac{f_y(x_1)-f_y(x_{-1})}{x_1-x_{-1}} \quad (22)$$

$$a_{y0}=f_y(x_1)-a_{yx}x_1 \quad (23)$$

$$a_{y1}=\frac{f_y(x_2)-f_y(x_1)}{x_2-x_1}-a_{yx} \quad (24)$$

$$b_{y1}=\frac{f_y(x_{-2})-f_y(x_{-1})}{x_{-1}-x_{-2}}+a_{yx} \quad (25)$$

$$a_{yi}=\frac{f_y(x_{i+1})-f_y(x_i)}{x_{i+1}-x_i}-a_{y,i-1} \quad (26)$$

and $$b_{yi}=\frac{f_y(x_{-i-1})-f_y(x_{-i})}{x_{-i}-x_{-i-1}}-b_{y,-i+1} \quad (27)$$

where $f_y(x)$ is given by Equation 17 and where $i=2, 3, \ldots$ N.

Similarly, $$a_{0x}=\frac{f_0(x_1)-f_0(x_{-1})}{x_1-x_{-1}} \quad (28)$$

$$a_{00}=f_0(x_1)-a_{0x}x_1 \quad (29)$$

$$a_{01}=\frac{f_0(x_2)-f_0(x_1)}{x_2-x_1}-a_{0x} \quad (30)$$

$$b_{01}=\frac{f_0(x_{-2})-f_0(x_{-1}}{x_{-1}-x_{-2}}+a_{0x} \quad (31)$$

$$a_{0i}=\frac{f_0(x_{i+1})-f_0(x_i)}{x_{i+1}-x_i}-a_{0,\,i-1} \quad (32)$$

$$b_{0i}=\frac{f_0(x_{-i-1})-f_0(x_{-i})}{x_{-i}-x_{-i-1}}-b_{0,-i+1} \quad (33)$$

where $f_0(x)$ is given by Equation 16.

Finally, one may obtain:

$$a_{ix}=\frac{f_i(x_1)-f_i(x_{-1})}{x_1-x_{-1}} \quad (34)$$

$$a_{i0}=f_i(x_1)-a_{ix}x_1 \quad (35)$$

$$a_{ij}=\frac{f_i(x_{j+1})-f_i(x_j)}{x_{j+1}-x_j}-a_{i,\,j-1} \quad x>x_0,\ y>y_0 \quad (36)$$

$$a_{ij}=\frac{f_i(x_{-j-1})-f_i(x_{-j})}{x_{-j}-x_{-j-1}}-b_{i,-j+1} \quad x<x_0,\ y>y_0 \quad (37)$$

$$c_{ij}=\frac{f_i(x_{-j-1})-f_i(x_{-j})}{x_{-j}-x_{-j-1}}-c_{i,-j+1} \quad x<x_0,\ y<y_0 \quad (38)$$

$$d_{ij}=\frac{f_i(x_{j+1})-f_i(x_j)}{x_{j+1}-x_j}-d_{i,\,j-1} \quad x>x_0,\ y<y_0 \quad (39)$$

where $f_i(x)$ is given by Equations 20 and 21, and where in each of Equations 36 through 39 $i=1, 2, \ldots N$ and $j=1, 2 \ldots$ M.

From the above, and from FIGS. 5*a* and 5*b* one may deduce that the following amount of equipment is required in order to generate a single function of two variables over 2M+2 data points for one variable and 2N+2 data points for the second variable:

Table I

| Component: | Number required |
|---|---|
| Operational amplifiers | 2M+4N+4 |
| DAC's | M+2N+4 |
| MDAC's | (M+1)(N+2) |
| Comparators | 2 |
| SPST electronic switches | 2 |
| Multipliers | N+1 |

Once the equipment of Table I has been provided, further two-variable functions $f(x, z)$ having one variable *x* common with that of the existing apparatus may be generated, over 2M+2 data points of the common variable and 2K+2 data points of the third variable $z$, with only the following additional equipment now listed in Table II.

Table II

| Component: | Number required |
|---|---|
| Operational amplifiers | 2K+3 |
| DAC's | 4K+2 |
| MDAC's | (M+1)K |
| Comparators | 1 |
| SPST electronic switches | 1 |
| Multipliers | K+1 |

Once the equipment of Table I has been provided, further two-variable functions $f(x, y)$ of the same two variables $x$ and $y$ may be generated, at the same 2M+2 times 2N+2 data points, with only the following additional equipment now listed in Table III.

Table III

| Component: | Number required |
|---|---|
| Operational amplifiers | 2N+1 |
| DAC's | N |
| MDAC's | (M+1)K |
| Multipliers | N+1 |

(In each of the tables, suitable registers and gates must be provided, of course, to apply register contents to the DAC's and MDAC's.)

It may be seen by comparing the component requirements of the above tables with the component requirements of the prior art devices mentioned, that by use of the two-sided interpolation functions, or otherwise expressed, by time-sharing most of the DAC's and MDAC's between the time when a given variable is above a reference value and the time when it is below the reference value, the invention allows one to reduce the number of MDAC's required by approximately a factor of four, multipliers by a factor of two, and amplifiers by a factor of two.

At this point it will have become apparent to those skilled in the art that following the methods described, the invention readily may be extended to three-variable function generation, using 8 input registers for the MDAC's which generate the individual interpolation function gain constants $r_{ijk}$ rather than the four input registers used to generate the $r_{ij}$ quantities as in FIGS. 5*a* and 5*b*. And that the invention may be readily extended in straightforward fashion to generation of functions of four or more variables also will be readily apparent.

The registers utilized to store the various functions coefficients may comprise any of many known forms of parallel digital registers, and in many embodiments of the invention may comprise conventional punched card readers, so that standard Hollerith cards may be used to program the invention to generate desired functions, with punched holes in the cards providing parallel digital signals to the DAC's and MDAC's.

The DAC's and MDAC's may comprise various known forms of such devices, and each typically will comprise a plurality of scaling resistors, or a ladder network or a voltage-divider with an electronic switch for each digital bit in the digital coefficient words. A variety of suitable conventional analog and hybrid analog-digital computer components are readily available for construction of the disclosed devices.

It will be seen that use of the two-sided interpolation functions in accordance with the invention reduces the component requirements by also a factor of $2_n$, where $n$ is the number of independent input variables, while yet retaining all of the static and dynamic advantages of incremental slope function generators. The maximum allowable velocity without incurring undesirable transients also may be seen to be much improved over that of comparable hybrid function generators. Use of the ideal absolute value or half-wave rectifier circuit enables one to eliminate any effect due to diode rounding, and thereby allows simple formulas to be used for the calculation of various DAC and MDAC inputs. By selectively switching one of plural registers into the DAC's and MDAC's, it will be seen that many fewer DAC's and MDAC's are required, without deteriorating the system bandwidth.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Apparatus for generating an analog output signal in accordance with a desired function of an independent variable, comprising, in combination:

a plurality of digital-to-analog converter means operative to receive respective digital input signals and to provide respective analog output signals;

a first plurality of pairs of register means for supplying pairs of digital signals respectively for said converter means;

first switching means for selectively applying one or the other of the digital signals of each pair to its associated digital-to-analog converter means;

fourth means including comparator means and second switching means for providing a further signal proportional in magnitude to the instantaneous value of said independent variable, said further signal having one polarity or the other relative to a reference level in accordance with the instantaneous value of said independent variable relative to a reference value;

a plurality of unipolar summing circuit means each connected to receive the analog output signal of a respective one of said digital-to-analog converter means and to receive said further signal, and each operative to provide a respective output signal in accordance with their sum whenever their sum exceeds a predetermined reference level;

a plurality of multiplying digital-to-analog converter means each adapted to receive a respective digital input signal and a respective analog input signal and operative to provide a respective analog output signal, each of said multiplying digital-to-analog converter means being connected to receive the output signal from a respective one of said unipolar suming circuit means;

a second plurality of pairs of register means for supplying a respective pair of digital signals for each of said multiplying digital-to-analog converter means;

third switching means for selectively applying one or the other of said digital signals of each pair of said second plurality of register means to its respective multiplying digital-to-analog converter means; and combining means for combining the output signals of said multiplying digital-to-analog converter means to provide said analog output voltage, said first and third switching means being connected to be controlled by said comparator means.

2. Apparatus according to claim 1 having a further register means for providing a further digital signal; a further digital-to-analog converter connected to receive said further digital signal and connected to a reference signal source and operative to provide a bias signal; and circuit means for applying said bias signal to said combining means.

3. Apparatus according to claim 1 having a further register means for providing a further digital signal; a further multiplying digital-to-analog converter means connected to receive said further digital signal and a further analog signal proportional to the instantaneous value of said independent variable and operative to provide a central-slope signal; and circuit means for applying said central-slope signal to said combining means.

4. Apparatus according to claim 1 in which said fourth means comprises a further register means for providing a further digital signal; a further digital-to-analog converter means responsive to said further digital signal and connected to a reference signal source and operative to provide a second analog signal; means for providing a third analog signal proportional to the instantaneous value of said independent variable; comparator means operable to compare said second and third analog signals to provide a switching signal; and summing circuit means including said second switching means responsive to said third analog signal for providing said further signal, said second switching means and said first and third switching means being connected to be controlled by said switching signal from said comparator means.

5. Apparatus according to claim 1 in which at least one of said unipolar summing circuit means comprises an operational amplifier having an output terminal and a summing junction terminal, a first feedback circuit comprising a first diode connected between said terminals, and a second feedback circuit comprising a resistance and a second diode connected between said terminals, said first and second diodes being oppositely-poled.

6. Apparatus according to claim 1 in which said combining means comprises a feedback amplifier connected to receive output currents from said multiplying digital-to analog converter means.

7. Apparatus according to claim 1 including a second plurality of multiplying digital-to-analog converter means; a third plurality of pairs of register means for supplying a respective pair of digital signals for each of said multiplying digital-to-analog converter means of said second plurality; fourth switching means for selectively applying one or the other of said digital signals of each pair of said third plurality of register means to its respective multiplying digital-to-analog converter means of said second plurality; and second combining means for combining the output signals of said multiplying digital-to-analog converter means of said second plurality to provide a second analog output voltage in accordance with a second desired function of said independent variable, said fourth switching means being connected to be controlled by said comparator means.

8. Apparatus according to claim 1 in which said first and third switching means each comprises first and second groups of gate circuits, one group of gate circuits being operable to connect the digital signal in one register of each pair of registers whenever the instantaneous value of said independent variable has one sign relative to said reference value, and the other group of gate circuits being operable to connect the digital signal in the other register of each pair of registers whenever the instantaneous value of said independent variable has the opposite sign relative to said reference value.

9. Apparatus according to claim 5 in which at least one of said unipolar summing circuit means includes an inverter amplifier connected to said output terminal.

10. Apparatus according to claim 1 in which said fourth means includes first and second comparator means and second and fourth switching means, said first comparator means and second switching means being operative to provide a first further signal proportional in magnitude to the instantaneous value of said independent variable with one polarity or the other relative to said reference level in accordance with the instantaneous value of said independent variable relative to a first reference value, said second comparator and said fourth switching means being operative to provide a second further signal proportional in magnitude to the instantaneous value of said independent variable with one polarity or the other relative to said reference level in accordance with the instantaneous value of said independent variable relative to a second reference value.

11. Apparatus for generating an analog output signal as a desired function of first and second independent variables, comprising, in combination:

first and second groups of digital-to-analog converter means;

first and second groups of register means for supplying pairs of digital signals respectively to each of said converter means;

first and second groups of switching means for selectively applying one or the other of the digital signals of each pair to its associated digital-to-analog converter means;

first and second circuit means each including a comparator means and a third switching means for providing first and second signals proportional in magnitude to the instantaneous values of said first and second independent variables, respectively, and each having one polarity or the other relative to a reference level in accordance with the instantaneous value of its associated independent variable relative to a reference value;

first and second groups of unipolar summing circuit means, each of said summing circuit means of said first group being connected to receive the output signal of a respective one of said digital-to-analog converter means of said first group and to receive said first signal, each of said summing circuit means of said second group being connected to receive the output signal of a respective one of said digital-to-analog converters of said second group and said second signal, and each of said summing circuit means being operative to provide an output signal in accordance with the sum of the two signals applied to it whenever the sum exceeds a predetermined reference level;

a plurality of groups of multiplying digital-to-analog converter means each adapted to receive a respective digital input signal and the output signal from a respective one of the unipolar summing circuit means of said first group;

a plurality of groups of quartets of register means for supplying a respective quartet of digital signals for each of said multiplying digital-to-analog converter means;

first combining means for combining the output signals of each group of multiplying digital-to-analog converter means to provide a second plurality of signals;

a plurality of electronic multipliers each connected to receive a respective one of said signals of said second plurality and the output signal from a respective one of the unipolar summing circuit means of said second group and each operative to provide an output signal commensurate with their product; and second combining means for combining said product signals to provide said analog output signal, said first group of switching means being controlled by the comparator means of said first circuit means, said second group of switching means being controlled by the comparator means of said second circuit means, and said fourth switching means being controlled by both of said comparator means.

References Cited

UNITED STATES PATENTS

| | | | |
|---|---|---|---|
| 3,185,827 | 5/1965 | Herndon | 235—150.53 |
| 3,217,151 | 11/1965 | Miller et al. | 235—150.53 X |
| 3,373,273 | 3/1968 | Schubert | 235—150.53 X |

MALCOLM A. MORRISON, Primary Examiner

J. F. RUGGIERO, Assistant Examiner

U.S. Cl. X.R.

235—197